P. C. ABBOTT.
SAW HANDLE.
APPLICATION FILED DEC. 4, 1918.
1,324,712.
Patented Dec. 9, 1919.
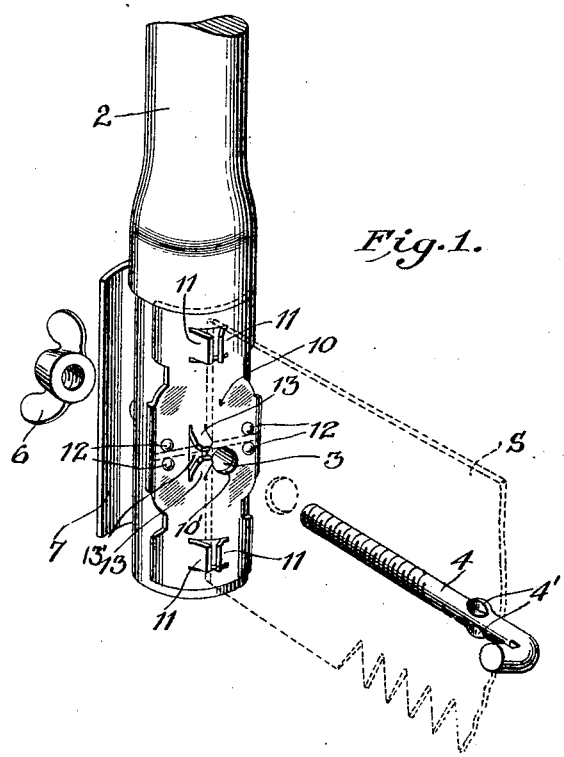
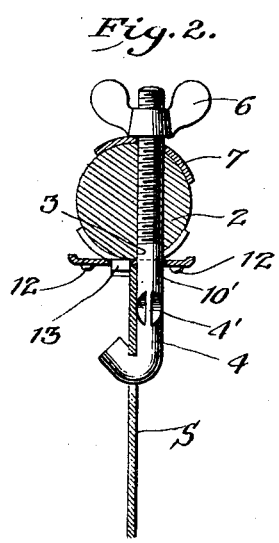
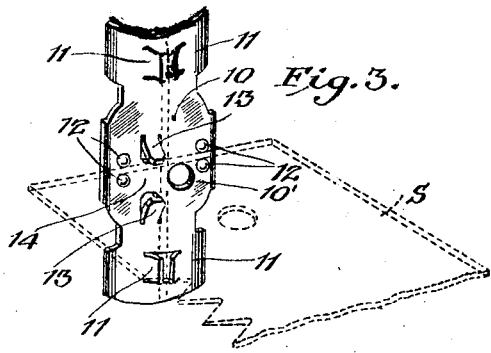
Inventor
Percy C. Abbott
By Mason Fenwick & Lawrence,
Attorneys

UNITED STATES PATENT OFFICE.

PERCY C. ABBOTT, OF RICHMOND, VIRGINIA, ASSIGNOR TO HARDWARE SPECIALTY CO., INC., OF RICHMOND, VIRGINIA, A CORPORATION OF VIRGINIA.

SAW-HANDLE.

1,324,712.

Specification of Letters Patent.

Patented Dec. 9, 1919.

Application filed December 4, 1918. Serial No. 265,294.

*To all whom it may concern:*

Be it known that I, PERCY C. ABBOTT, a citizen of United States, residing at Richmond, in the county of Henrico and State of Virginia, have invented certain new and useful Improvements in Saw-Handles; and I do hereby declare the following to be a full, clear, and exact description of the invention, such as will enable others skilled in the art to which it appertains to make and use the same.

This invention relates to saws and more particularly to saw handles.

Cross cut saw handles usually involve a combination of pieces, which might be termed a set, whereby the end of the saw may be firmly and quickly adjusted against the end of a handle and secured in position. These sets usually comprising a butt plate or wearing member, forming a seat for the end of the saw and a hook or fastening device passing through the butt member and engaging the saw; this fastening device generally comprising a hook bolt with a nut on one of its ends. To my knowledge no means has heretofore been provided for preventing the butt plate from passing off the head or hook end of the bolt and therefore these members may readily be disassembled and lost, thus causing inconvenience and expense which it is the object of the present invention to overcome.

Another object of the present invention is to provide a butt plate having a bolt receiving hole so arranged that a bolt when adjusted therein may be utilized without lateral change of position to hold the saw either transversely or parallel to the axis of the handle and also to support the side of the saw in either of its positions.

Another object of the invention is to provide a plate of this type having a set or plurality of tongues or lugs so disposed as to serve to support the side of the saw in combination with the fastening bolt or hook irrespective of the position of the saw.

With these and other objects in view as will be rendered manifest to those versed in the art, the invention consists of the construction, the combination, and in details and arrangement of the parts as more particularly described hereinafter as relative to the embodiment of the invention shown in the accompanying drawings, in which, Figure 1 is a perspective view of the saw handle with the members of the clamping set in perspective view ready to be assembled thereon and showing an end of the saw blade disposed parallel to the axis of the handle.

Fig. 2 is a cross section through the saw handle in the plane of the axis of the bolt in that form of the invention illustrated in Fig. 1.

Fig. 3 is a perspective view of the slightly modified form of the plate.

In the drawing a suitable handle is indicated at 2, which is transversely perforated to provide an aperture 3, to receive a bolt 4, having a hooked end and a threaded end, the latter adapted to receive a wing nut 6, which is adapted to bear up against a washer or plate 7, when it is turned on the bolt 4 to draw the latter up into position to secure the end of the saw S, shown in dotted lines, against the butt or plate 10. It is one of the important features of the present invention to provide for the prevention of loss or disassembling or dislocation of the elements of the set and to that end the bolt 4 is shown as provided with means designed to abut against the plate 10 which latter is provided preferably with an aperture of slightly larger diameter, than that of the bolt, this aperture being indicated at 10′ and the means being indicated at 4′, shown as comprising integral burs or shoulders, stamped or upset from the body of the bolt. In Fig. 1 it will be seen that the burs are provided on opposite sides of the bolt and in a plane perpendicular to the plane of the hook thereof.

From the above it will be seen that when the plate 10 is passed on to the body of the bolt 4 over its threaded portion it will be limited in its movements toward the hook by the shoulders or burs 4′ and then when the washer 7 passes onto the body of the bolt the nut 6 is finally screwed on and this keeps the parts in assembled relation and thus prevents accidental loss of the parts.

A further object of the invention resides in so positioning the bolt aperture 10′ so that the bolt can be utilized to secure the saw blade S in either longitudinal or transverse position as to the saw handle without lateral movement of the bolt. This I secure by disposing the bolt receiving aperture 10′ eccentrically to the longitudinal and transverse diameters of the plate and in such position as to rest the bolt against the side of the saw when it is adjusted in either of its positions upon the plate. To further secure the saw in position and prevent its slipping on its seat along the longitudinal and transverse diameters suitable sets of tongues or lugs 11, are upset in opposed relation adjacent the ends of the plate, these lugs or tongues being designed to embrace the end of the same when it is set parallel to the axis of the handle. Other prongs or projections may be disposed near the sides of the plate to engage the edge of the saw when it is disposed transversely, these projections being indicated at 12.

To coöperate with the fastening bolt 4 in the positioning of the end of the saw blade, I further provide tongues or upwardly extending projections 13, disposed in a line along the longitudinal axis of the plate these lugs being shown in Fig. 1, as struck upwardly from a common aperture 13' across the transverse diameter. In the modification shown in Fig. 3, the lugs 13 are struck up in relatively spaced position and leave at intermediate solid or reinforcing portions 14. In either form of the plate one of the lugs 13 is disposed relatively close to the transverse diameter, so that it will engage the side of the saw in either its longitudinal or transverse position on the plate.

What I claim is:

1. A saw handle butt plate having along its longitudinal medial portion and near its ends pairs of guide lugs to receive a saw end, and having a bolt hole closely contiguous to its transverse and longitudinal axes and a set of punched up tongues spaced from each other in a line parallel to the median longitudinal line so as to support the side of the saw in coöperation with the inserted bolt on the opposite side and permit the adjustment of the saw in a position transversely of the plate.

2. A saw handle butt plate having along its longitudinal medial portion and near its ends pairs of guide lugs to receive a saw end, and having a bolt hole closely contiguous to its transverse and longitudinal axes, and a set of tongues arranged in a line parallel to the median longitudinal line so as to support the side of the saw in coöperation with the inserted bolt on the opposite side, one of the tongues disposed so as to support the saw when it is arranged transverse to the plate.

3. A saw handle butt plate having a bolt hole eccentric to its transverse and longitudinal diameters and so disposed as to position a bolt to hold a saw end on either of said diameters by a quarter rotation of the bolt without lateral movement, and spaced supporting tongues disposed on opposite sides of the transverse diameter of the hole so as to coöperate with a bolt therein to support a saw, and between which the blade can be disposed transverse to the plate.

In testimony whereof I affix my signature.

PERCY C. ABBOTT.